Figure 4:
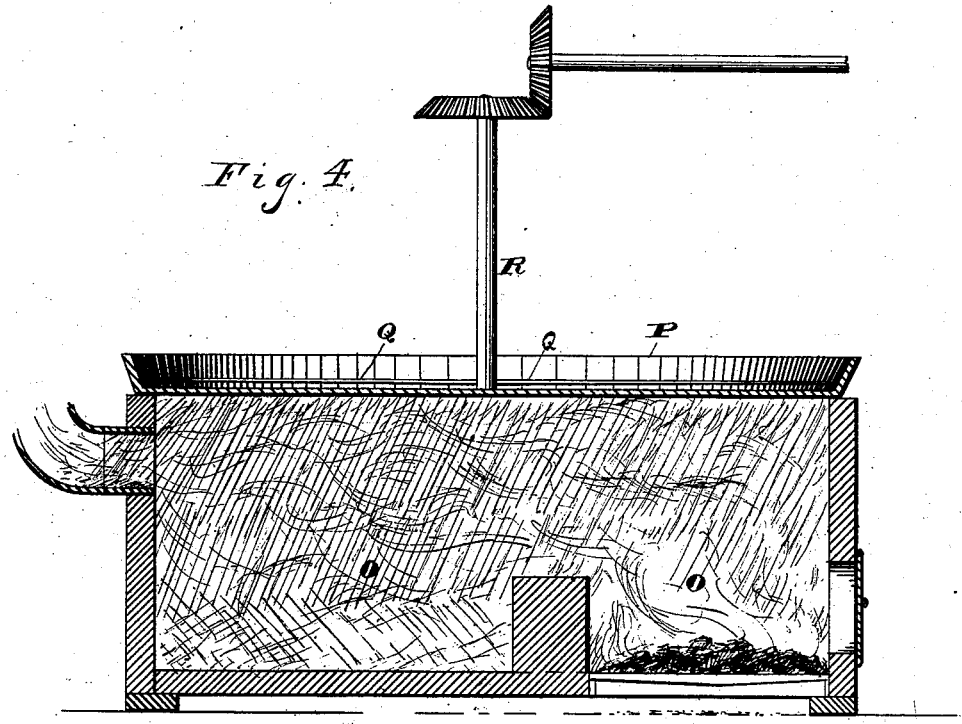

(No Model.) 4 Sheets—Sheet 1.
F. SCHUMACHER.
PROCESS OF DRYING GRAIN.
No. 281,402. Patented July 17, 1883.
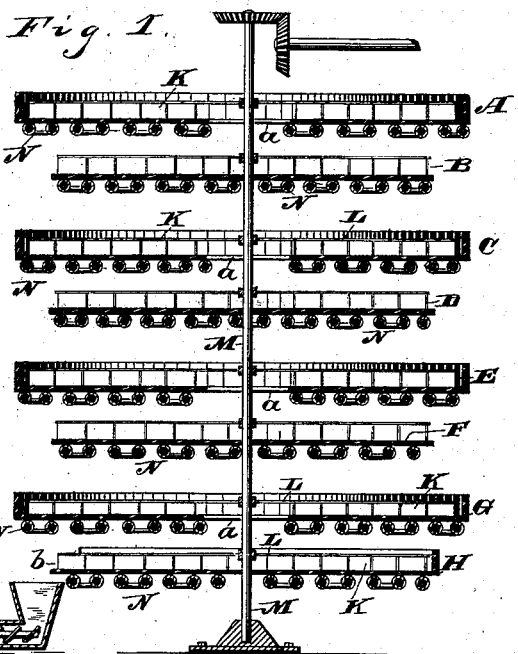
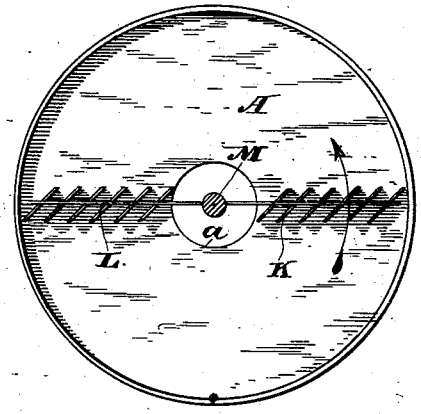
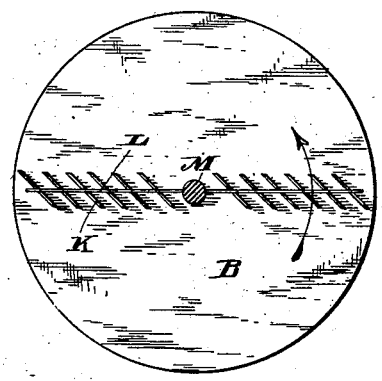
WITNESSES
George Cook.
S. G. Nottingham.
INVENTOR
Ferdinand Schumacher
By Leggett & Leggett
ATTORNEYS (No Model.) 4 Sheets—Sheet 2.

F. SCHUMACHER.
PROCESS OF DRYING GRAIN.

No. 281,402. Patented July 17, 1883.

WITNESSES
George Cook.
S. J. Nottingham

INVENTOR
Ferdinand Schumacher,
By Leggett & Leggett
ATTORNEYS (No Model.)  4 Sheets—Sheet 3.

F. SCHUMACHER.
PROCESS OF DRYING GRAIN.

No. 281,402. Patented July 17, 1883.

WITNESSES
George Cook.
S. G. Nottingham.

INVENTOR
Ferdinand Schumacher
By Leggett & Leggett
Attorneys.

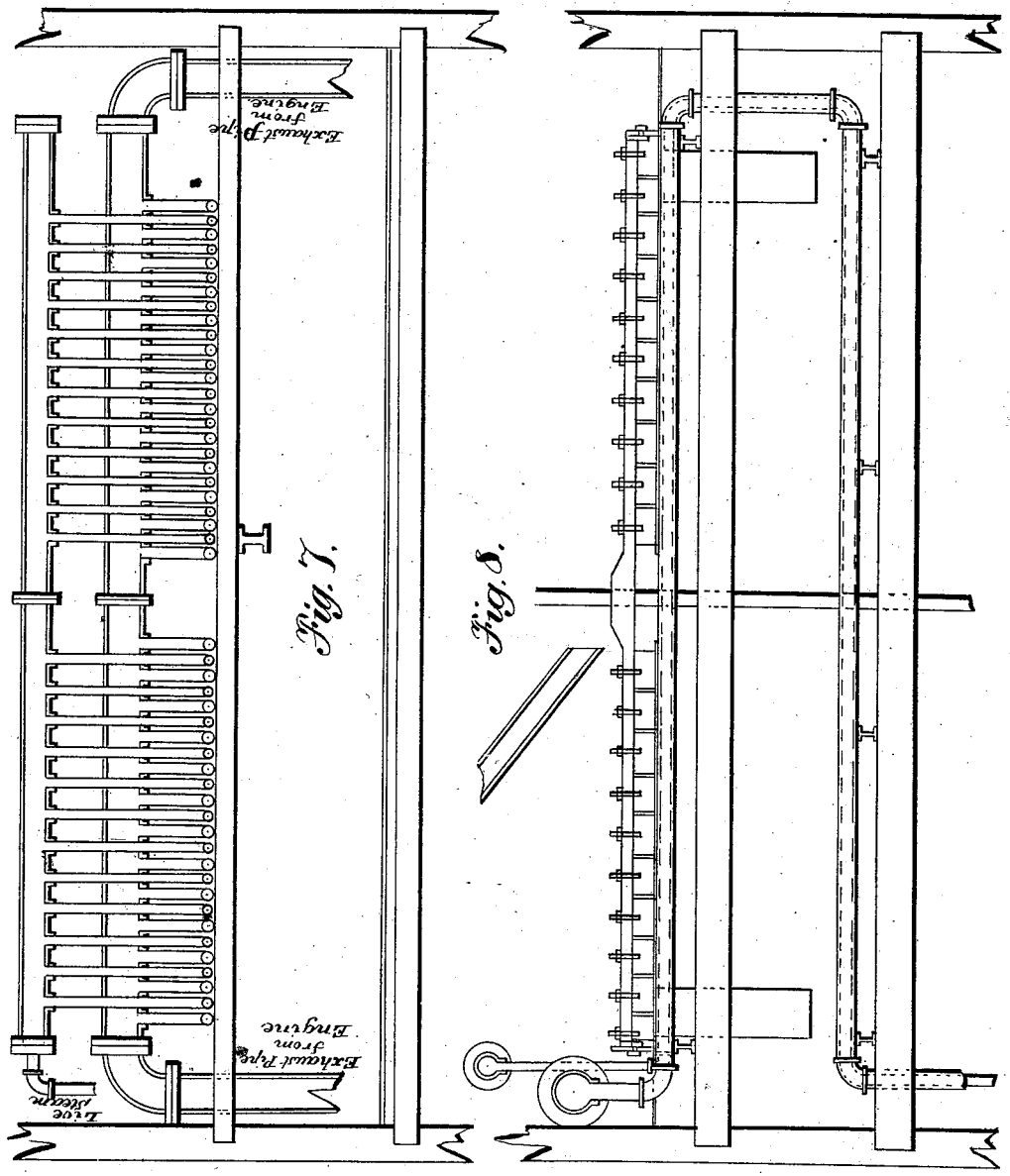

UNITED STATES PATENT OFFICE.

FERDINAND SCHUMACHER, OF AKRON, OHIO.

PROCESS OF DRYING GRAIN.

SPECIFICATION forming part of Letters Patent No. 281,402, dated July 17, 1883.

Application filed April 23, 1883. (No model.)

*To all whom it may concern:*

Be it known that I, FERDINAND SCHUMACHER, of Akron, in the county of Summit and State of Ohio, have invented certain new and useful Improvements in a Process of Drying Grain; and I do hereby declare the following to be a full, clear, and exact description of the invention, such as will enable others skilled in the art to which it pertains to make and use the same.

My invention relates to a process of drying grain—such as oats, wheat, or barley—preparatory to making the same into a coarsely-cut or broken product—such as oatmeal, cracked wheat, crushed barley, or the like; and it consists in the combined, or, more accurately speaking, successive application, first, of steam heat, and, second, of furnace heat, as drying agents to the grain, which during the drying process is stirred or in any suitable manner sufficiently agitated. It is desirable that the finished product (oatmeal, cracked wheat, crushed barley, or the like) shall have the original bright fresh color and appearance of the grain, and at the same time be perfectly dried, so as to be crisp and brittle, sweet and nutty to the taste, and more easily and perfectly preserved. If the grain is scorched in drying, its flavor is impaired and its color is darker, while if not perfectly dried, the product is soft, and is liable to become musty and soon unfit for use.

The old method of drying grain on kilns or furnaces covered with perforated plates, through which both heat and smoke and other products of combustion were allowed to pass, caused a very unpleasant smoky or bitter taste of the product, making it almost unfit for use. As an improvement upon this process I introduced, some twenty-five years ago, an apparatus consisting of a furnace closely covered with a circular imperforate basin of boiler-iron in which the grain is gently agitated by appropriate machinery. This I have found to serve a fairly good purpose so far as the final results on the product are concerned; but, owing to the length of time required in this way to properly dry the grain, constant personal attention is necessary to prevent discoloring, burning, or scorching of the product.

Besides the processes above referred to, the heat of steam, either direct or exhaust, has been used for drying grain; but this has proved insufficient to secure the desired degree of crispness and the nutty agreeable flavor of the product.

The process which constitutes my invention, and which forms the subject of this application, may be considered as a combination of the steam and the kiln-drying processes last referred to, in that it consists, first, in a partial drying upon a series of finely-perforated plates, beneath which are located steam-heating pipes; and, second, in a more complete and perfect drying by the use of kiln or furnace heat, by which the grain is more or less baked and the final product thereby greatly improved.

While I do not confine myself to any specific mechanism or apparatus in carrying out my process, I will, by way of making said process more clearly and better understood, describe it in connection with one form of apparatus that may be effectively employed in connection therewith.

Figure 5:
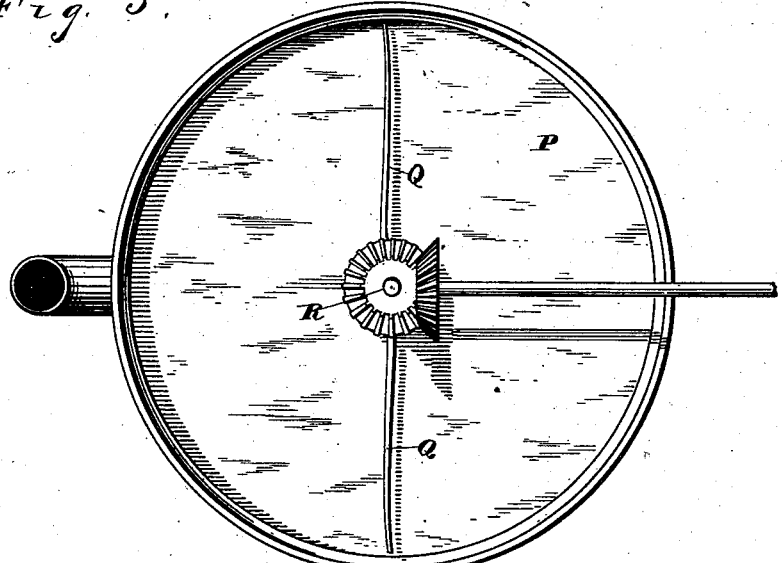
Figure 6:
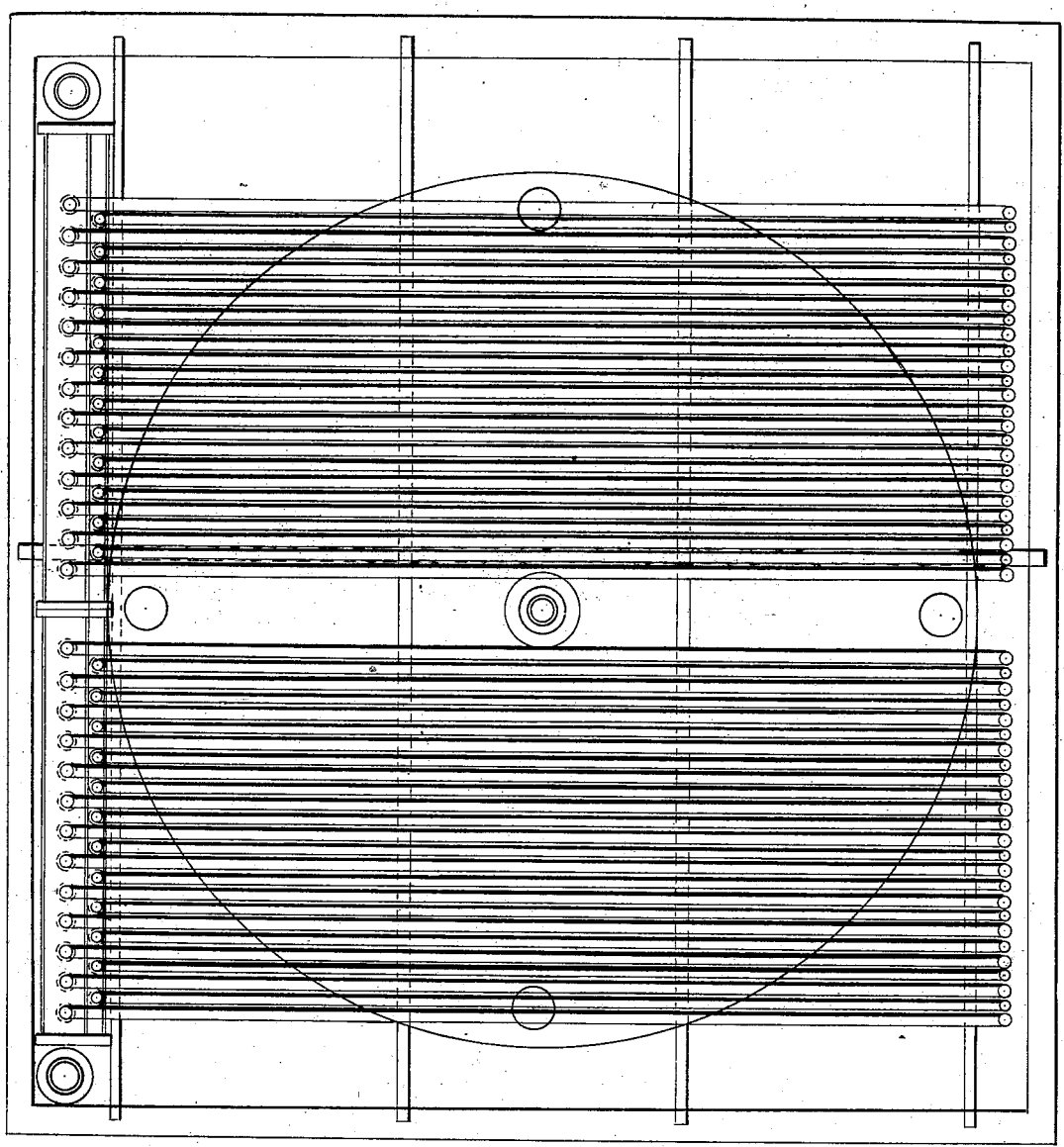

In the drawings, Figure 1 represents, partially in side elevation and partially in vertical cross-section, an apparatus for the primary or partial drying of the grain by steam heat. Fig. 2 is a plan view of one of the tables of the device shown in Fig. 1, showing its agitating and feeding blades as constructed to direct and discharge the grain toward the outer edge or skirt of the table. Fig. 3 is a plan view of a next succeeding table, showing its agitating and feeding blades as constructed to direct and discharge the grain toward the central part of the table. Fig. 4 is a vertical cross-section of a kiln for the secondary, more complete, and final drying of the grain. Fig. 5 is a plan view of the device shown in Fig. 4. Figs. 6, 7, and 8 are introduced to show an effective arrangement for applying steam heat to the grain-drying tables A B C, &c. Fig. 6 is a plan view of a drying-table and of the steam-pipes beneath it. Fig. 7 is a side elevation of the same, showing the pipes as applied to a single table, and Fig. 8 is a view, in side elevation, indicating the general plan upon which the steam-pipes are lead from one drying-table to another above or below it. It will be seen that this arrangement will enable me to use live or exhaust steam, or both, as may be desired. These drawings, (Figs. 6, 7, and 8,) with the arrows showing the direction of the steam-current, appear to present the apparatus so clearly that I do not deem a detailed specification thereof necessary.

A B C D E F G H are stationary circular tables or pans placed in series one above another, as shown, and supported in that position by the steam-pipes or any suitable frame. Each table or pan (constructed preferably from metal) is perforated for the circulation of hot air up through the series of pans and through the grain thereon. These perforations are numerous, and preferably sufficiently small to prevent the grain from sifting through them. Every alternate table—say A, C, E, and G—is constructed with a central opening, $a$, through which the grain is discharged to the table beneath, while the other tables, B, D, F, and H, have their discharge-openings located at the outer edge or skirt.

K K are agitating and feeding blades fixed slantingly upon an arm or support, L, which is rigidly attached to the central revolving shaft, M. As indicated in the drawings, if the blades are inclined in one direction or the other, they will, in revolving over their respective pans, not only agitate the grain thereon, but will gradually feed it toward the center or the skirt of said pan and discharge it through the openings $a$ or $b$. These blades are so adjusted in the pans A B C, &c., that the grain, as it is received in the upper pan, is discharged centrally therefrom upon the pan B, then carried from the center of the pan B to its skirt, and discharged through its opening $b$ upon the outer or peripheral portion of the pan C, thence carried inward over the pan C and discharged centrally upon the pan D, and so on, being alternately carried inwardly and outwardly over the drying-pans, and agitated the meanwhile by the action of the inclined revolving blades K. During all this time the grain is heated by steam heat, steam being admitted to the closed pipes N, that are located beneath the perforated tables A B C, &c.; and not only is the grain heated, but it is also subjected to a gentle circulation of hot air, because the heat from the pipes N causes the hot air to rise through the perforations of the plates and through the grain thereon. This circulation manifestly hastens the process of drying by facilitating evaporation in carrying off the moisture-laden air from the grain.

Any desired number of tables, A B C, &c., may be used. I find eight to be an effective number; but this number may be varied according to the diameter of said plates and the speed at which the grain is carried from one plate to another.

O, Fig. 4, represents any suitable furnace, over which is placed a circular metallic pan, P, in which the partially-dried grain from the steam-drying apparatus just specified is placed for its final drying.

Q is a revolving agitator, consisting of two or more arms fixed to a revolving shaft, R. This agitator is placed close to the surface of the pan P, and as it revolves stirs the grain and prevents it from being scorched in its final drying. When the grain in the pan P is sufficiently dried, it is taken out, and is now ready for milling.

Instead of employing the apparatus indicated in Fig. 4 of the drawings, I may use any other effective device for subjecting the partially-dried grain to furnace heat. Such apparatus, for instance, may consist of a series of pipes or hollow containers constructed to be revolved upon their longitudinal axes. These pipes are to be located in a suitable chamber sufficiently heated by a proper furnace. The grain is made to pass through these heated revolving pipes, and is thereby kept agitated until sufficiently dried and prepared for milling.

The revolving-pipe apparatus above referred to, so far as its general principles of construction and operation are concerned, is substantially such as the apparatus shown in English Patents Nos. 7,111 of 1836 and 1,902 of 1853.

It is my purpose to make a separate application for a patent upon this briefly-mentioned pipe apparatus and its mechanical equivalents, and therefore I do not in anything herein described or referred to relinquish any right to claim the same in a separate patent.

From the foregoing description of the apparatus that may be employed I can now more clearly describe my process, which constitutes the subject of this application. It consists in first partially drying grain by the application of steam heat, and afterward completing the drying process by the application of furnace heat. The grain is first placed upon the tables A B C, &c., where it is subjected to the steam heat of the pipes N, the drying process being assisted and hastened by the circulation of air through the perforations in said tables. After the steam-heating and drying process is completed the grain is carried through suitable spouts or conveyers, or both, to the furnace-heating apparatus, where the drying is completed and the grain fitted for milling.

What I claim is—

1. A method or process of preparing grain—such as oats, wheat, barley, or the like—for being made into a coarsely cut or broken product—such as oatmeal, cracked wheat, or crushed barley—said process consisting in first partially drying the grain by the application thereto of steam heat and afterward completing said drying by subjecting said grain to furnace or fire heat, substantially as set forth.

2. A method or process of drying grain, consisting in first subjecting said grain to heat produced by steam and afterward to furnace or kiln heat produced directly by fire, substantially as set forth.

3. A method or process of drying grain, consisting, first, in placing and exposing it in a state of agitation upon suitable tables or other receptacles that are heated by steam, and afterward placing and exposing said grain in a state of agitation upon or within a suitable receptacle that is heated directly by fire or furnace heat, substantially as set forth.

4. A method or process of preparing grain—such as oats, wheat, barley, or the like—for being made into a coarsely cut, crushed, or broken product—such as oatmeal, cracked wheat, or crushed oats or barley—said process consisting in first subjecting the grain to heat produced by steam until partially dried, and then subjecting it to furnace or kiln heat produced directly from fire until the said grain is not only dried, but more or less baked, substantially as and for the purpose set forth.

5. A method or process of drying grain, consisting in first exposing it upon or within a suitable receptacle heated by steam, and at the same time agitating the grain and causing a circulation of warm air to pass through it, and afterward placing said grain, when it has been partially dried by the steam heat just referred to, in or upon a suitable receptacle heated by a furnace, within which furnace-heated receptacle said grain is kept until completely dried and more or less baked, substantially as set forth.

In testimony whereof I sign this specification, in the presence of two witnesses, this 25th day of November, 1882.

FERDINAND SCHUMACHER.

Witnesses:
L. L. LEGGETT,
ALBERT E. LYNCH.